United States Patent
Rodriguez et al.

(10) Patent No.: US 12,355,789 B2
(45) Date of Patent: Jul. 8, 2025

(54) AUTO SMART GROUPS TREND ANALYTICS

(71) Applicant: KnowBe4, Inc., Clearwater, FL (US)

(72) Inventors: Jasmine Rodriguez, Clearwater, FL (US); Andy Reed, St Petersburg, FL (US); Mark Ezell, Riverview, FL (US)

(73) Assignee: KnowBe4, Inc.

( * ) Notice: Subject to any disclaimer, the term of this patent is extended or adjusted under 35 U.S.C. 154(b) by 317 days.

(21) Appl. No.: 17/890,100

(22) Filed: Aug. 17, 2022

(65) Prior Publication Data

US 2023/0066777 A1    Mar. 2, 2023

Related U.S. Application Data

(60) Provisional application No. 63/234,666, filed on Aug. 18, 2021.

(51) Int. Cl.
*H04L 9/40* (2022.01)
*G06F 16/903* (2019.01)
(Continued)

(52) U.S. Cl.
CPC .... *H04L 63/1425* (2013.01); *G06F 16/90335* (2019.01); *G06F 16/906* (2019.01);
(Continued)

(58) Field of Classification Search
CPC ... H04L 63/14; H04L 63/1425; H04L 63/104; H04L 63/1483; H04L 63/1408;
(Continued)

(56) References Cited

U.S. PATENT DOCUMENTS 8,615,807 B1    12/2013    Higbee et al.
8,635,703 B1    1/2014    Belani et al.
(Continued)

FOREIGN PATENT DOCUMENTS

EP         3 582 468 A1    12/2019
WO    WO-2016/164844 A1    10/2016

OTHER PUBLICATIONS

International Search Report and Written Opinion on PCT Appl. Ser. No. PCT/US2022/040623 dated Nov. 24, 2022 (19 Pages).

*Primary Examiner* — Shaqueal D Wade-Wright
(74) *Attorney, Agent, or Firm* — Foley & Lardner LLP

(57) ABSTRACT

The systems and methods disclose creating variations of criteria for a query-based group of users. One or more criteria from a plurality of criteria available is selected to form a query to identify members of query-based group of users. Using the selected one or more criteria, query-based groups of users are generated. Each of the plurality of query-based groups of users may have a query with a variation of the selected one or more criteria. A user count data of user membership in each query-based group of the query-based groups of users is determined based at least on applying the query of each of the plurality of query-based groups of users to one or more databases. One or more of the plurality of query-based groups of users is identified as being validated for a statistical significance based at least on the user count data and the one or more criteria.

20 Claims, 11 Drawing Sheets

(51) Int. Cl.
*G06F 16/906* (2019.01)
*G06F 21/55* (2013.01)
*G06F 21/57* (2013.01)

(52) U.S. Cl.
CPC .......... *G06F 21/552* (2013.01); *H04L 63/104* (2013.01); *H04L 63/1483* (2013.01); *G06F 21/577* (2013.01)

(58) Field of Classification Search
CPC ........ G06F 21/50; G06F 21/55; G06F 21/552; G06F 16/90335; G06F 16/906; G06F 16/90; H04W 12/12
See application file for complete search history.

(56) References Cited

U.S. PATENT DOCUMENTS

| | | | |
|---|---|---|---|
| 8,719,940 B1 | 5/2014 | Higbee et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,591,017 B1 | 3/2017 | Higbee et al. | |
| 9,667,645 B1 | 5/2017 | Belani et al. | |
| 9,912,687 B1 | 3/2018 | Wescoe et al. | |
| 10,904,186 B1 | 1/2021 | Everton et al. | |
| 10,922,423 B1 | 2/2021 | Rungta et al. | |
| 10,963,920 B2 * | 3/2021 | Marlin | H04L 67/02 |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2010/0114954 A1 * | 5/2010 | Sareen | G06F 16/951 707/E17.108 |
| 2016/0164898 A1 | 6/2016 | Belani et al. | |
| 2016/0301705 A1 | 10/2016 | Higbee et al. | |
| 2016/0343100 A1 | 11/2016 | Davenport et al. | |
| 2017/0017992 A1 * | 1/2017 | Gusev | G06Q 30/0201 |
| 2017/0177879 A1 | 6/2017 | Sharma et al. | |
| 2018/0309764 A1 * | 10/2018 | Kras | G09B 19/0053 |
| 2019/0173819 A1 | 6/2019 | Wescoe et al. | |
| 2019/0245885 A1 | 8/2019 | Starink et al. | |
| 2020/0311260 A1 | 10/2020 | Klonowski et al. | |
| 2021/0185075 A1 | 6/2021 | Adams | |
| 2021/0194924 A1 | 6/2021 | Heinemeyer et al. | |
| 2021/0407308 A1 | 12/2021 | Brubaker et al. | |
| 2022/0005373 A1 | 1/2022 | Nelson et al. | |
| 2022/0006830 A1 | 1/2022 | Wescoe | |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1 | 4/2022 | Krishna Raju et al. | |
| 2022/0286419 A1 | 9/2022 | Stetzer et al. | |
| 2023/0009127 A1 * | 1/2023 | Boyer | H04L 63/1425 |

* cited by examiner

AUTO SMART GROUPS TREND ANALYTICS

RELATED APPLICATIONS

This patent application claims the benefit of and priority to U.S. Provisional Patent Application No. 63/234,666 titled "AUTO SMART GROUPS TREND ANALYTICS," and filed Aug. 18, 2021, the contents of all of which are hereby incorporated herein by reference in its entirety for all purposes This disclosure generally relates to security awareness management. In particular, the present disclosure relates to systems and methods for auto smart groups trend analytics.

BACKGROUND OF THE DISCLOSURE

Organizations have recognized that cybersecurity incidents are a prominent threat that can cause serious breaches of data including confidential information. The cybersecurity incidents can cost the organizations millions of dollars each year in actual costs and can cause customers to lose trust in the organizations. The number of incidents of cybersecurity attacks and the costs of mitigating the damage is increasing every year. Many organizations invest in cybersecurity tools such as antivirus, anti-ransomware, anti-phishing, and other quarantine platforms. Such cybersecurity tools may detect and intercept known cybersecurity attacks. However, new and unknown security threats involving social engineering may not be readily detectable by such cyber security tools, and the organizations may have to rely on their employees (referred to as users) to recognize such threats. To enable their users to stop or reduce the rate of cybersecurity incidents, the organizations may conduct security awareness training for their users. The organizations may conduct security awareness training through a security awareness system, an in-house cybersecurity team and/or use third parties who are experts in matters of cybersecurity. The security awareness system facilitates cybersecurity awareness training via simulated attacks, a reporting platform, computer-based training, risk score generation, gamification, and tracking.

BRIEF SUMMARY OF THE DISCLOSURE

In an example embodiment, a method for creating variations of criteria for a query-based group of users includes selecting, by a device, one or more criteria from a plurality of criteria available to form a query to identify members of a query-based group of users, generating using the selected one or more criteria, a plurality of query-based groups of users, each of the plurality of query-based groups of users having a query with a variation of the selected one or more criteria, determining, by the device, user count data of user membership in each of the plurality of query-based groups of users based at least on applying the query of each of the plurality of query-based groups of users to one or more databases, and identifying, by the device, one or more of the plurality of query-based groups of users as being validated for a statistical significance based at least on the user count data and the one or more criteria.

In some implementations, the criteria include one of a field criteria or a string criteria.

In some implementations, the field criteria include one or more of a user field, user date, phishing event, training event or assessment.

In some implementations, the method further includes selecting, by a criteria generator, one or more field criteria and string criteria for the one or more criteria from which to generate variations of the query to form the plurality of query-based groups of users.

In some implementations, the method further includes adjusting, by a normalizer, data from the one or more databases to include relevant data points.

In some implementations, the method further includes analyzing, by a significance analyzer, the user count data for each of the plurality of query-based group of users to determine the statistical significance for each of the plurality of query-based group of users.

In some implementations, the method further includes performing, by the statistical analyzer, user count slope analysis on the user count data.

In some implementations, the method further includes determining for one of the plurality of query-based group of users that a difference between a consecutive rate-of-change and an average rate-of-change is greater than an abnormal variance threshold and identifying one of the user count data or query for the one of the plurality of query-based group of users as abnormal.

In some implementations, the method further includes comparing, by a comparative analyzer, the user count data of the plurality of query-based groups of users to a benchmark user count database.

In some implementations, the method further includes determining for one of the plurality of query-based group of users that the user count data varies from a benchmark user count more than a normal variance threshold and identifying one of the user count data or query for the one of the plurality of query-based group of users as abnormal.

A system for creating variations of criteria for a query-based group of users includes one or more processors, coupled to memory and configured to: select one or more criteria from a plurality of criteria available to form a query to identify members of a query-based group of users, generate using the selected one or more criteria, a plurality of query-based groups of users, each of the plurality of query-based groups of users having a query with a variation of the selected one or more criteria, determine user count data of user membership in each of the plurality of query-based groups of users based at least on applying the query of each of the plurality of query-based groups of users to one or more databases, and identify one or more of the plurality of query-based groups of users as being validated for a statistical significance based at least on the user count data and the one or more criteria.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for auto smart groups trend analytics.

A. Computing and Network Environment

Figure 1A:
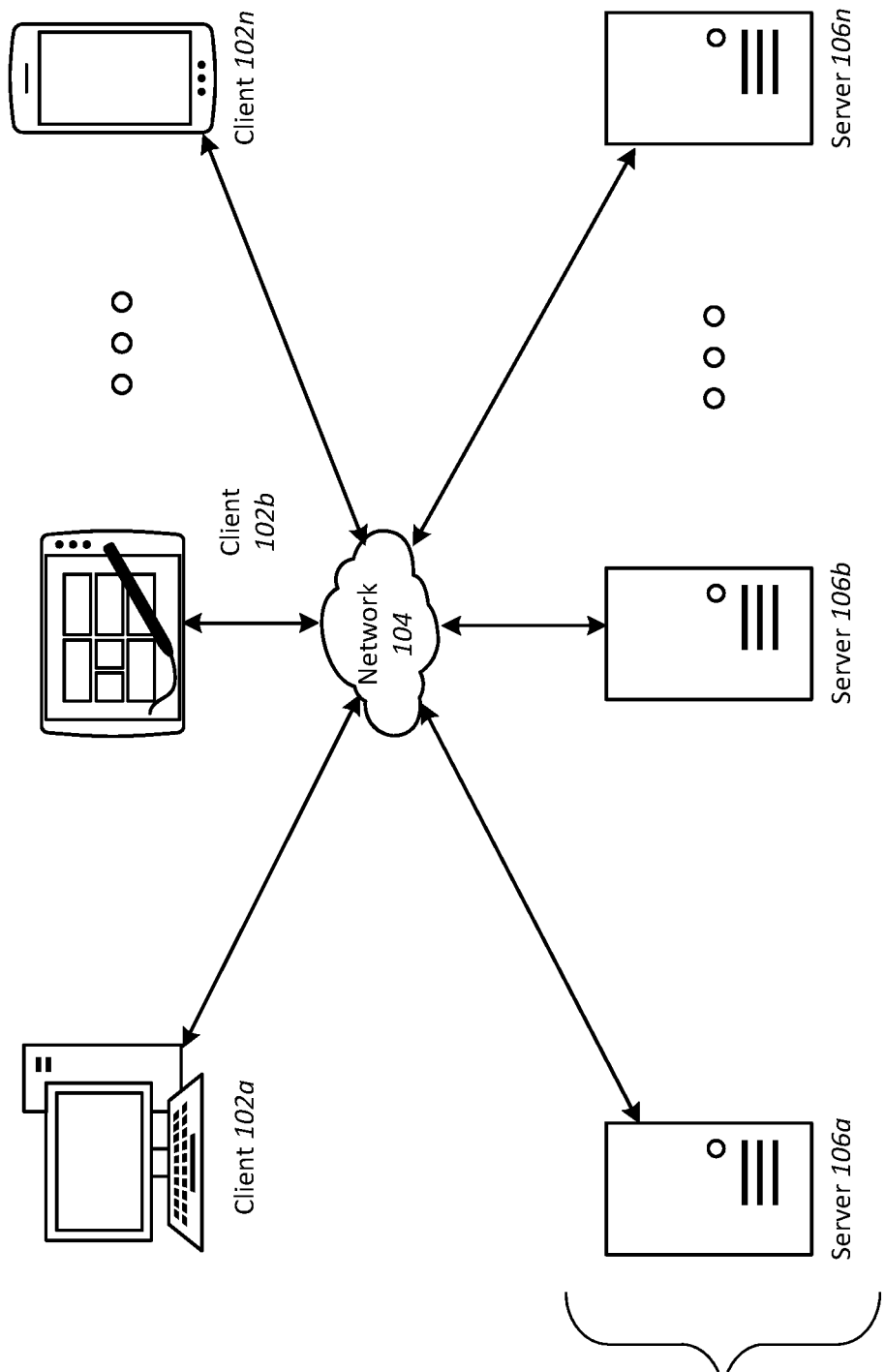
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
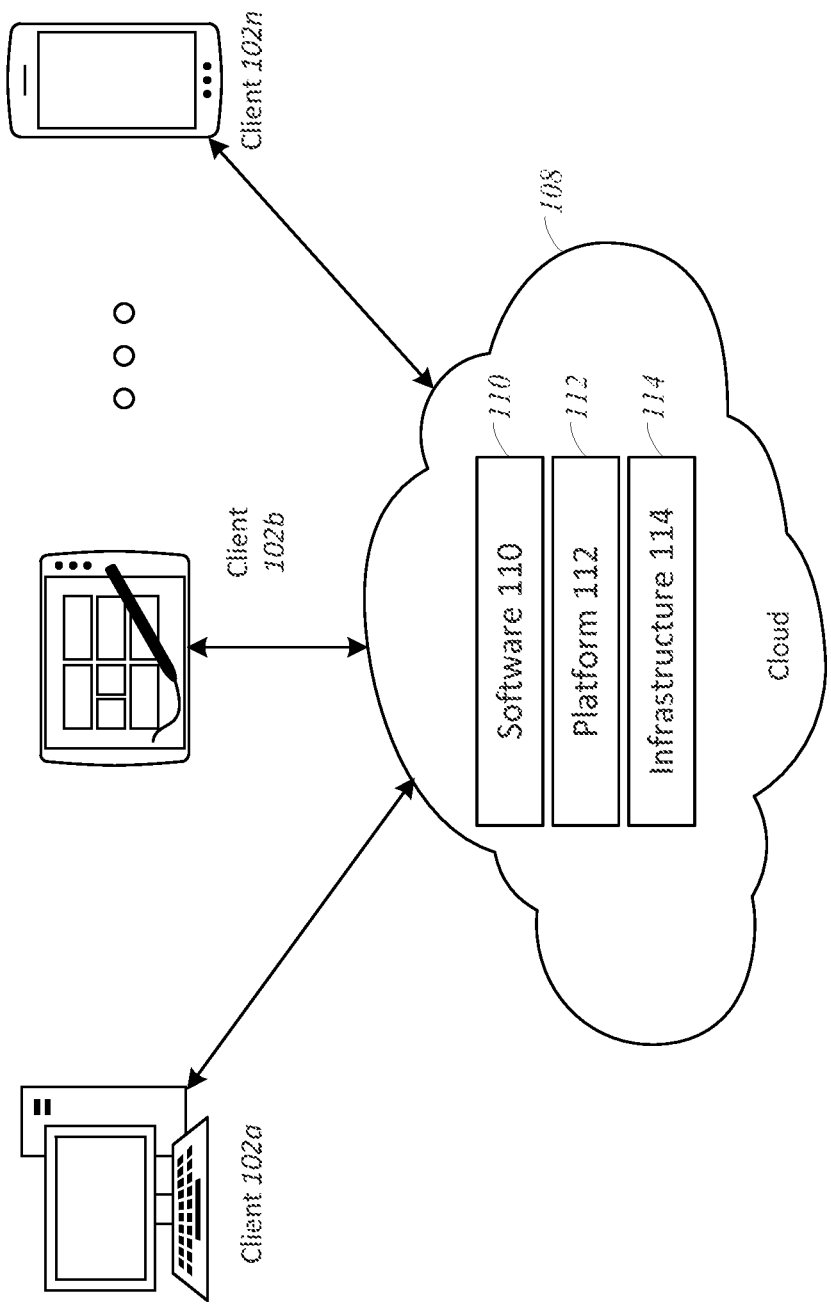
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
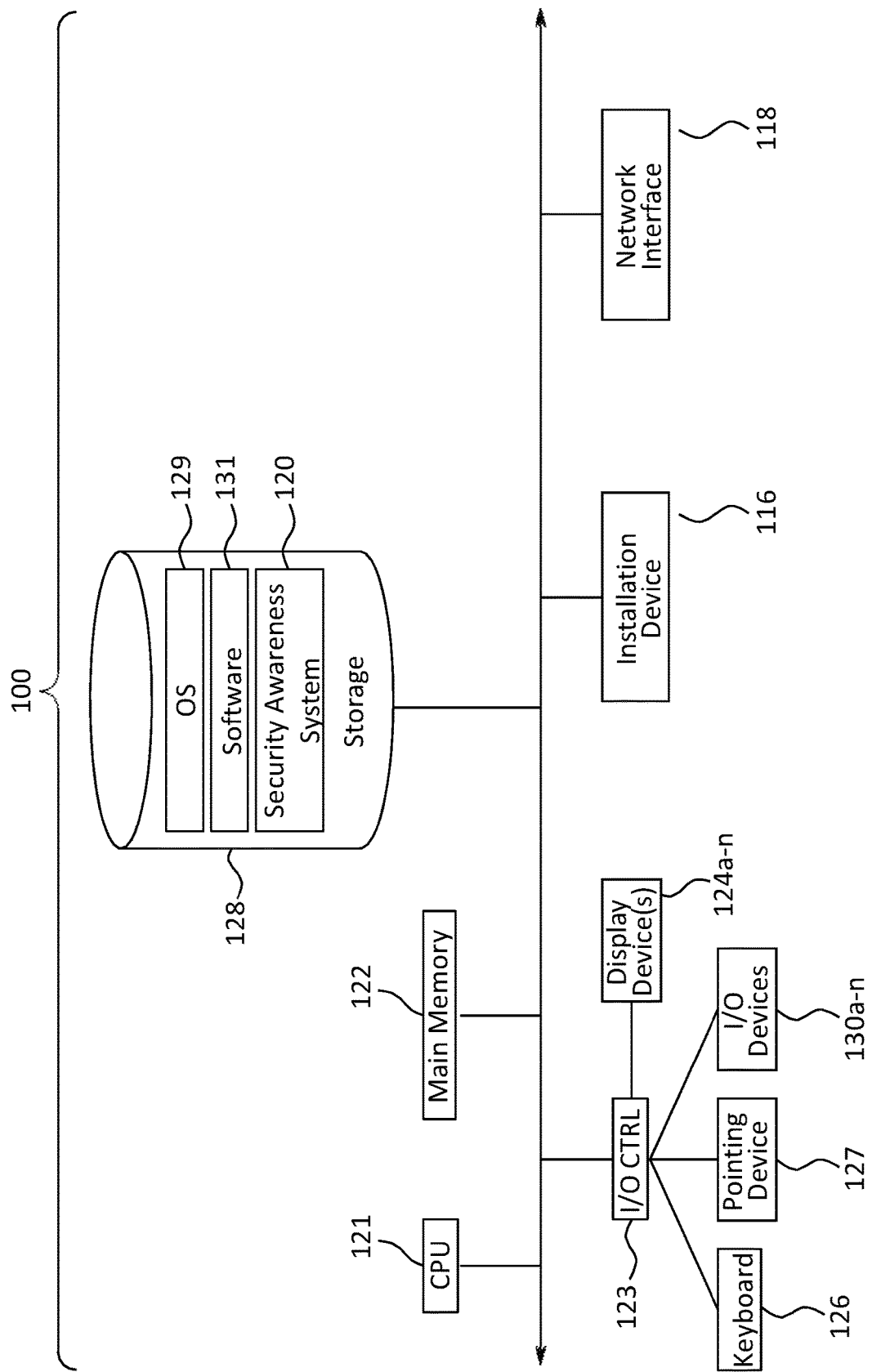
FIGS. 1C and 1D are block diagrams depicting embodiments of computing devices useful in connection with the methods and systems described herein.
Figure 1D:
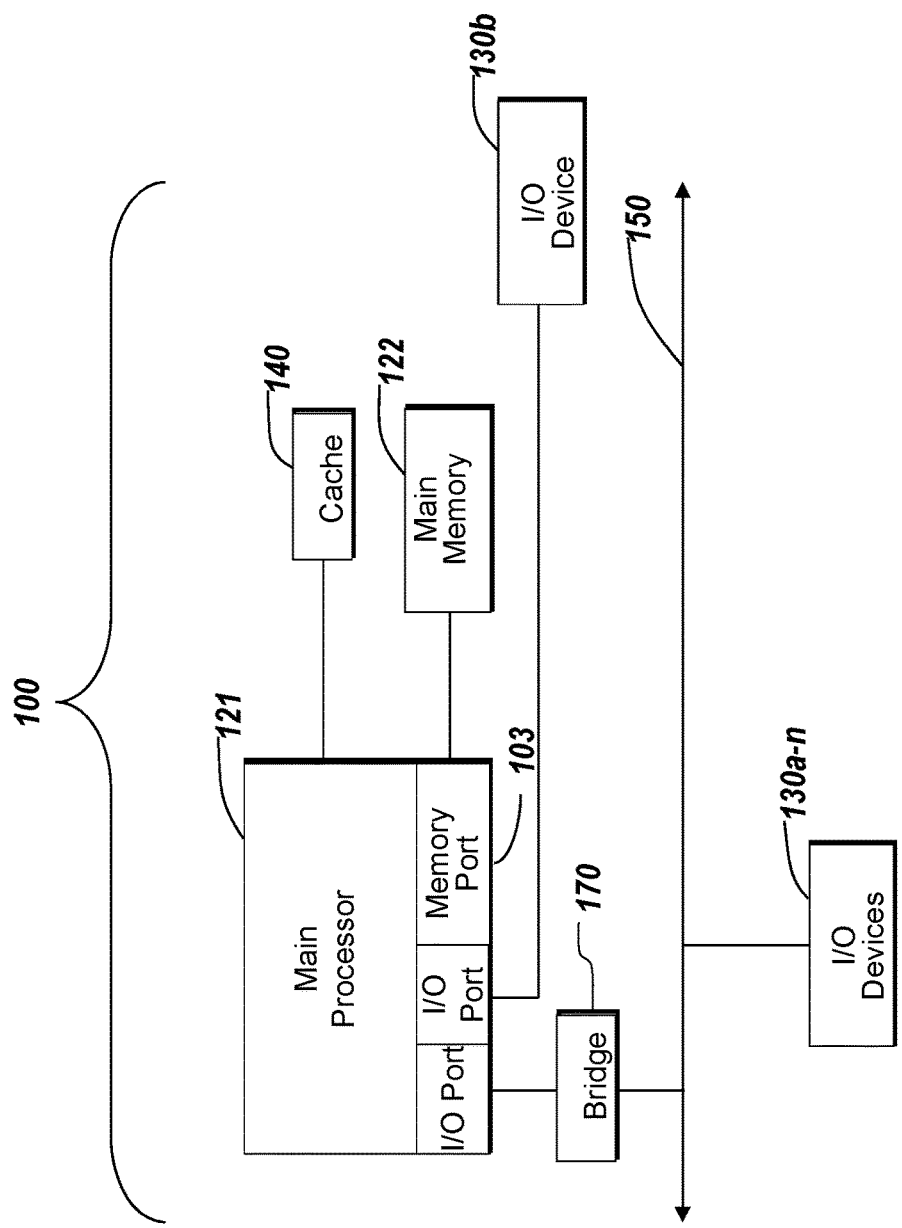

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a security awareness system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode (LED) displays, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the WAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Auto Smart Groups Trend Analytics

The following describes systems and methods for auto smart groups trend analytics. Security awareness system 120 may be a system that manages aspects relating to cybersecurity awareness for an organization. Security awareness system 120 may include a message interception and analysis component, a message reporting component, a simulated phishing component, a message modification component, a message extraction and replacement component, a risk score generation component, and a gamification component. Security awareness system 120 may be an overarching description of a complete cybersecurity awareness system and may encompass items such as an email client plug-in, a threat reporting platform, a threat detection platform, and a security awareness and training platform (not shown).

Every user who joins an organization may be added to the organization's account. In context of the present disclosure, the organization may be an entity that is subscribed to or makes use of services provided by security awareness system 120. The organization may have an account with security awareness system 120. Security awareness system 120 may provide service to multiple organizations. The organization may be expanded to include all users within the organization, vendors to the organization, or partners of the organization. All users that are added to the organization's account with security awareness system 120 may be provided with a user profile and an identifier. Once a user is enrolled with the organization and added to the organization's account in security awareness system 120, the security awareness and training platform, which is a part of security awareness system 120 may provide security awareness trainings to the user. The security awareness and training platform may be a platform facilitating cybersecurity awareness training via simulated phishing campaigns, computer-based training, and risk score generation and tracking. The security awareness and training platform may track and test the user to determine an improvement of security awareness in the user. Security awareness system 120 and the security awareness and training platform may track actions by a user associated with security awareness training and testing, and records the actions against the user profile and the identifier. Such actions associated with the user profile and the identifier may be used by security awareness system 120 to determine and display the user's performance (for example, the user's performance in simulated phishing campaigns). Security awareness system 120 and the security awareness and training platform may collect user data and events associated with each of the users to be used in risk score calculations as well as to determine membership in query-based groups, and to display a chosen query-based group data to a system administrator. The risk score may be a metric that reflects a cybersecurity risk that a subject poses to an organization. The risk score may reflect the cybersecurity risk of a user, a group of users, an organization, an industry, a geography, and other examples. The system administrator may be an individual or team who oversees security awareness system 120 of an organization with responsibilities including configuring of system personal information use, managing simulated phishing campaigns and simulated attacks, and managing any other element within the security awareness system. The user data may include information captured in user fields by the security awareness and training platform (examples shown in Table 2).

The security awareness and training platform may create a user timeline beginning from the addition of the user into the organization's account. The user timeline may include security awareness and training platform events in addition to a timestamp associated with each event. The user timeline may provide a complete history of the user's phishing tests, related emails, and training. The security awareness and training platform may collect and timestamp a collection of user events (and in examples, may mark some events as important) in the user timeline. The security awareness and training platform may track a number of unique events and actions performed by the user in addition to profile information and may record the information on the user timeline. Examples of the events and information included in a user timeline are provided below in Table 1. The security awareness and training platform may add user profile data contained in the user fields, and events that are collected and stored daily, or at other frequencies, in the user timeline, from the time that the user profile is added to the organization's account.

TABLE 1

| | User events |
|---|---|
| General user events: | User was created. |
| | User logged in. |
| Phishing test-related events: | User received an email. |
| | User bounced an email. |
| | User clicked a link. |
| | Only the first click recorded. |
| | The total number of clicks. |
| | User opened an attachment. |
| | User entered data on a landing page. |
| | User enabled a macro. |
| | User replied to an email. |
| | User passed a phishing test. |
| | User reported an email using an email client plug-in. |
| | User reported an email as spam. |
| Vishing test-related events: | User passed a vishing test. |
| | User failed a vishing test. |
| Training-related events: | User was added to a training campaign. |
| | User was enrolled in a course. |
| | User started a course. |
| | User completed a course. |
| | User was enrolled in an assessment. |
| | User started an assessment. |
| | User completed an assessment. |
| | User was enrolled in a policy. |
| | User started a policy. |
| | User completed a policy. |
| Other: | A click or other failure type was removed from phishing test results. |
| | User's email address was found in a security breach. |

The email client plug-in referred to in Table 1 may be an application program that may be added to an email client for providing one or more additional features or for enabling customization of existing features. For example, email client plug-in may be used by the user to report suspicious emails. Some examples of email client plug-ins that may be used by the user to report suspicious emails include a Phish Alert Button (PAB).

Security awareness system 120 may provide a tool for the system administrator to create and manage query-based groups of users based on chosen criteria. These query-based groups of users may also be referred to interchangeable as smart groups. The tool may provide options for the system administrator to add and remove users dynamically from query-based groups of users based at least on the user information (e.g. user profile data including the user fields and user events) collected in the user timeline and modifying specifications. The modifying specification may include criterion modifiers that provide comparative context to one or more criteria. The modifying specifications may include equality and inequality symbols (<, <=, =, >=, >, ≠), value counts, and timeframes.

Examples of the one or more criteria are provided below which include user fields (shown in Table 2), user date (shown in Table 3), phishing events (shown in Table 4), training events (shown in Table 5), and assessments (shown in Table 6). Some of the criteria may include time frame options, for example, a specific start and end date, on or before/after a specific date, or duration options, such as in the last specific number of days/weeks/months.

TABLE 2

| User Fields |
| --- |
| User Fields, Modifying Specification (condition (must/must not), comparison (=, >, <), and values) |
| First Name |
| Last Name |
| Location |
| Manager |
| Manager's Email |
| Email Aliases |
| Primary Email |
| Job Title |
| Phone Number |
| Phone Number's Extension |
| Mobile Phone Number |
| Division |
| Employee Number (number) |
| Employee Number (text) |
| Phish-prone Percentage |
| Risk Score |
| Risk Booster |
| Query-Based Group Name |
| Organization |
| Department |
| Language |

TABLE 3

| User Date |
| --- |
| User Date (condition (must/must not), date type (created, last login, employee start date)) |

TABLE 4

| Phishing Events |
| --- |
| Phishing Events (condition (must/must not), comparison (=, >, <), count, time frame, relative time frame (before training, after training, . . .)) |
| Any failures |
| Any failures but clicks |
| Passed |
| Opened |
| Clicked |
| Replied |

TABLE 4-continued

| Phishing Events |
| --- |
| Bounced |
| Delivered |
| Opened attachment |
| Enabled macro |
| Entered data |
| Reported |

TABLE 5

| Training Events |
| --- |
| Training Events (condition (must/must not), scope (selected training(s), all training assignments), time frame) |
| Enrolled |
| Started |
| Completed |

TABLE 6

| Assessments |
| --- |
| Assessments (condition (must/must not), scope (selected assessments), all assessments), knowledge area, comparison, score, time frame) |

The Phish-prone Percentage referred to in Table 2 is a measure of the percentage of users tested who took an unsafe action in response to a simulated phishing email, such as clicking a link or opening an attachment. The Risk Booster referred to in Table 2 is a functional label provided by the administrator to intentionally increase or decrease the risk score of any user or group. The risk booster is provided based on user's or group's position or job title (the user or group is more likely to be targeted by phishing or social engineering attacks), access to privileged and/or confidential information (that would increase the impact of a successful social engineering or phishing attack) and risk score (high risk score).

In one or more embodiments, the tool may provide a dashboard with options to the system administrator to identify and group the users based on at least their user information stored in the user timeline by way of query-based groups. The tool may present to the system administrator a user count of a given query-based group on the dashboard as well as changes in query-based group membership over time.

The tool may enable the system administrator to plot the daily user counts against time to create trendlines to visualize data changes over the course of a given query-based user group's history. The tool may enable the system administrator to group combinations of criteria together in a query-based group to analyze the user count trend for a collection of specified criteria. The information included in the user timeline may be insightful when combined in an appropriate query-based group. The user counts may illustrate trends within an organization or across organizations that assist the system administrator in preparing the organization to defend itself from a cybersecurity threat.

The system administrator of the organization may be unaware of trends manifesting outside the query-based user groups they have created and chosen to track (i.e., of trends in query-based groups of users that they are not tracking on their dashboard). There may be more criteria combinations than can be specified by the system administrator to categorize all the important data and events into query-based groups for user count tracking. In examples, the system administrator may not have the time, capabilities, or creativity to test different criteria combinations (which may be in hundreds of thousands or higher). Therefore, the system administrator may miss user count trends for specific criteria or groups of criteria that could prove important to the security of the organization. Also, the system administrator's knowledge may be limited to information about behavior of the users of their own organization. The system administrator may not have knowledge of a typical user count trend for a particular query-based group in their industry, and would therefore be unaware of atypical user count trends within their organization. The administrator may also be unaware of system-wide user counts for various criteria that would indicate their organization being more susceptible to certain types of phishing attacks than other organizations, for example, in their industry, in their geographic area, or more broadly.

The disclosure provides an auto smart group system that automatically creates and applies multiple criteria combinations to categorize all the important data and events into query-based groups for user count tracking. The auto smart group system may also facilitate identifying system-wide user counts for various criteria that would indicate that their organization may be more susceptible to certain types of phishing attacks than other organizations.

Figure 2:
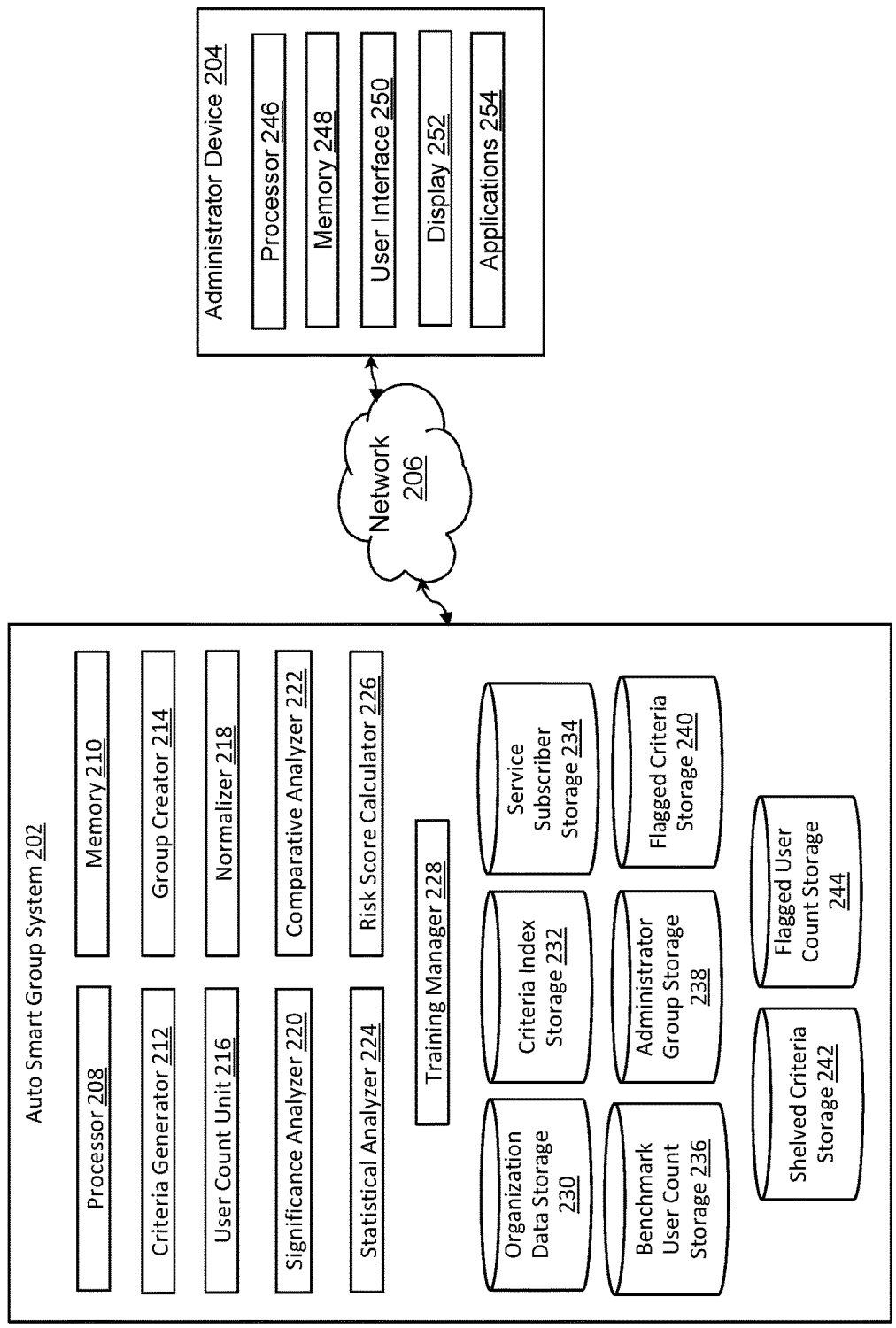
FIG. 2 depicts some of the server architecture of an implementation of system 200 for creating and managing query-based group of users, according to one or more embodiments.

FIG. 2 depicts some of the server architecture of an implementation of system 200 for creating and managing query-based group of users, according to some embodiments. System 200 may be a part of security awareness system 120. Security awareness system 120 may be a cybersecurity awareness system that manages aspects associated with cybersecurity awareness for an organization. The organization may encompass all users within the organization, vendors to the organization, or partners of the organization. Security awareness system 120 may implement auto smart group system 202 as a part of system 200. System 200 may include auto smart group system 202, administrator device 204, and network 206 enabling communication between the system components for information exchange. Network 206 may be an example or instance of network 104, details of which are provided with reference to FIG. 1A and its accompanying description.

Auto smart group system 202 may be a computational system that automatically generates and applies the one or more criteria to user information datasets to display potentially important query-based group data to the system administrator.

According to one or more embodiments, auto smart group system 202 may be implemented in a variety of computing systems, such as a mainframe computer, a server, a network server, a laptop computer, a desktop computer, a notebook, a workstation, and any other computing system. In an implementation, auto smart group system 202 may be implemented in a server, such as server 106 shown in FIG. 1A. In some implementations, auto smart group system 202 may be implemented by a device, such as computing device 100 shown in FIGS. 1C and 1D. In some embodiments, auto smart group system 202 may be implemented as a part of a cluster of servers. In some embodiments, auto smart group system 202 may be implemented across a plurality of servers, thereby, tasks performed by each of auto smart group system 202 may be performed by the plurality of servers. These tasks may be allocated among the cluster of servers by an application, a service, a daemon, a routine, or other executable logic for task allocation. Each of security awareness and auto smart group system 202 may comprise a program, service, task, script, library, application or any type and form of executable instructions or code executable on one or more processors. Auto smart group system 202 may be implemented by one or more modules, applications, programs, services, tasks, scripts, libraries, applications, or executable code.

Auto smart group system 202 may include processor 208 and memory 210. For example, processor 208 and memory 210 of Auto smart group system 202 may be CPU 121 and main memory 122, respectively, as shown in FIGS. 1C and 1D. Auto smart group system 202 may include criteria generator 212, group creator 214, user count unit 216, normalizer 218, significance analyzer 220, comparative analyzer 222, statistical analyzer 224, risk score calculator 226, training manager 228, organizational data storage 230, criteria index storage 232, service subscriber storage 234, benchmark user count storage 236, administrator group storage 238, flagged criteria storage 240, shelved criteria storage 242, and flagged user count storage 244.

Criteria generator 212 may be a program or application configured to automatically generate one or more queries using one or more criteria from a plurality of criteria available, thereby simulating a system administrator's creation of query-based group of users. In one or more embodiments, to generate the one or more queries, criteria generator 212 may select one or more criteria from the plurality of criteria available to form a query. In some examples, criteria generator 212 may use a series of computational random number generators to randomly select a number of field criteria and/or string criteria from a list of possible criteria. Field criteria may be smart group criteria existing in a predetermined static list of criteria stored in security awareness system 120. Examples of field criteria include one or more of a user field, user date, phishing event, training event or assessment. String criteria are smart group criteria described by string or numerical values. Examples of string criteria include strings of values such as email domain, date, or threshold. Group creator 214 may generate a plurality of query-based groups of users using the one or more queries generated by criteria generator 212. Group creator 214 may use each of the plurality of query-based groups of users to generate a further plurality of query-based groups of users by generating variations of the one or more criteria. The total number of members in a query-based group may be referred to as user count data.

Normalizer 218 may be a program or application configured to remove outliers or other abnormalities from data that may distort the user count data for a query-based group of users. In one or more embodiments, normalizer 218 may adjust the data to align with the one or more criteria selected by criteria generator 212. In an example, normalizer 218 may adjust the data from one or more databases such as service subscriber storage 234 to include relevant data points by removing outliers or other abnormalities from data that may distort the user count data. In an example, normalizer 218 may be configured to detect variations in the number of users added to the query-based group. For example, normalizer 218 may detect that the number of users added to the query-based group is greater in one time period compared to previous time periods. The normalizer 218 may detect such variations, for example, due to a large number of new hires in the organization and may exclude data for those users from the query-based group. In examples, the normalizer 218 may exclude data related to any of the possible criteria used by group creator 214 to generate a plurality of query-based groups of users. For excluding the data, normalizer 218 may use timestamp of user events and user information to account for employees who were added to the organization's account after a start of a simulated phishing campaign, newer employees who are yet to be included in the simulated phishing campaign, and employees added to the organization partway through a chosen time interval for a plurality of query-based groups of users. Normalizer 218 may ensure that all data that is utilized is relevant to the criteria generated by criteria generator 212.

Significance analyzer 220 may be a program or application configured to analyze data, for example, user count data for each of the plurality of query-based groups of users, to determine a statistical significance for each of the query-based groups of users. In some examples, significance analyzer 220 may use statistical analysis techniques to determine the statistical significance for each of plurality of query-based group of users. In examples, groups may be determined to not have statistical significance if the user count for the group is zero or if the user count will be static over a time period.

Comparative analyzer 222 may be a program or an application configured as a data preparation unit as well as a comparison engine between benchmark user count data and the user count data of the organization. Comparative analyzer 222 may compare the user count data of one or more query-based groups of users to a benchmark user count data. Benchmark user count data may be generated from query-based groups applied across multiple organizations to identify typical ranges of the user count data across all organizations, an industry, or any other demographic. In one embodiment, comparative analyzer 222 may use statistical techniques for the comparison, and may determine variance between the user count data and the benchmark user count data. In context of the disclosure, comparative analyzer 222 may group organizations together based on defining characteristics including the number of employees, the industry type, public or private sector, the age of employees, and other demographics to enable the comparison of organizations with specific demographics. By grouping these organizations together by the defining characteristics, comparative analyzer 222 may enable the system administrator to compare their organization's user count trends to other companies in the same field or related field. Comparative analyzer 222 may determine whether a difference between the user count data and the benchmark user count data is greater than a normal variance threshold to flag the user count data and a corresponding query. In an example, the normal variance threshold may be a number of standard deviations away from the benchmark user counts that is declared to be acceptable. In examples, the normal variance threshold is set by the system administrator and may be defined as the number of standard deviations away from the benchmark user counts that may result in the comparative analyzer 222 flagging the query-based user group.

Statistical analyzer 224 may generate and perform slope analysis on user count data. In one embodiment, using statistical analysis techniques, statistical analyzer 224 may determine the average rate-of-change and consecutive rate-of-change of the user count data over a time interval for one or more query-based groups of users. In context of the disclosure, statistical analyzer 224 may flag the user count data and a corresponding query for one or more query-based groups of users when the difference between the consecutive rate-of-change and average rate-of-change exceeds an abnormal variance threshold. In some examples, the abnormal variance threshold is set by the system administrator and may be defined as a numerical multiplier representing the order of magnitude difference between the consecutive rate-of-change and average rate-of-change that may results in the statistical analyzer 224 flagging the query-based user group.

Risk score calculator 226 may be a program or an application that calculates a risk score of a user, a group of users including query-based groups, an organization, an industry, a geography, and other such logical categories. Risk score calculator 226 may calculate the risk score based on information associated with a user, including whether a user's email address was associated with a security breach, responses to a simulated phishing campaign, assessed behavior, training received, roles within an organization, the subject's network, and/or any other attribute that may be associated with the subject. Training manager 228 may be a program or an application configured to deliver training to a user or a query-based group of users based on risk scores, user behaviors, the user data, and/or combination thereof.

Organization data storage 230 may be a database that stores employee information in user fields, user timelines, user events, and user information fields. Criteria index storage 232 may store one or more criteria that were selected to form a query to identify members of a query-based group of users which have been validated for statistical significance. In an example of criteria being validated for statistical significance, the user count data for the criteria may be processed by a significance analyzer 220. The example criteria may be found to be certain to or likely to have a constant user count of zero users. This criteria grouping may then be invalidated and removed for not being statistically significant. In another example of criteria being validated for statistical significance, the user count data for the criteria may be run through a significance analyzer 220. The example criteria may be found to have a constant user count of a fixed integer. Due to the static nature of the group, the criteria grouping may then be invalidated and removed for being not statistically significant. In examples, the significance analyzer 220 will assess the likelihood of the criteria to form a query-based group of users that will vary with time and identify such groups as valid. Service subscriber storage 234 may be a database that may store user information such as user field, user timeline, user event, and any other information related to the user for all organizations subscribing to auto smart group system 202. In some examples, information in service subscriber storage 234 may be indexed by demographic information (i.e., company size, public or private sector, industry, number of employees, etc.). This demographic information may be used to group organizations that are suitable for comparison to the system administrator's organization. Benchmark user count storage 236 may store benchmark user count data that may be obtained by applying the query of each of the plurality of query-based groups of users to service subscriber storage 234 and then validating for statistical significance.

Administrator group storage 238 may be a database configured to store the system administrator created query-based user groups and system administrator configuration data, such as the normal variance threshold. Flagged criteria storage 240 may be a database configured to store queries for the plurality of query-based group of users that are identified as abnormal by statistical analyzer 224.

Shelved criteria storage 242 may be a database configured to store query-based user groups and corresponding information that is discarded by the system administrator. Flagged user count storage 244 may be a database configured to store user count data for the one of the plurality of query-based group of users that are identified as abnormal by significance analyzer 220.

Referring back to FIG. 2, in some embodiments, administrator device 204 may be any device used by an administrator to perform administrative duties of auto smart group system 202. Administrator device 204 may be any computing device, such as a desktop computer, a laptop, a tablet computer, a mobile device, a Personal Digital Assistant (PDA), smart glasses, or any other computing device. In an implementation, administrator device 204 may be a device, such as client device 102 shown in FIG. 1A and FIG. 1B. Administrator device 204 may be implemented by a device, such as computing device 100 shown in FIG. 1C and FIG. 1D. According to some embodiments, administrator device 204 may include processor 246 and memory 248. In an example, processor 246 and memory 248 of administrator device 204 may be CPU 121 and main memory 122, respectively, as shown in FIGS. 1C and 1D. Administrator device 204 may also include user interface 250, such as a keyboard, a mouse, a touch screen, a haptic sensor, a voice-based input unit, or any other appropriate user interface. It shall be appreciated that such components of administrator device 204 may correspond to similar components of computing device 100 in FIGS. 1C and 1D, such as keyboard 126, pointing device 127, I/O devices 130a-n and display devices 124a-n. Administrator device 204 may also include display 252, such as a screen, a monitor connected to the device in any manner, a wearable glass, or any other appropriate display. In an implementation, administrator device 204 may display received content (for example, messages) for the user using display 252 and is able to accept user interaction via user interface 250 responsive to the displayed content.

In some implementations, administrator device 204 may include a communications module (not shown). This may be a library, an application programming interface (API), a set of scripts, or any other code that may facilitate communications between administrator device 204 and auto smart group system 202. In some embodiments, the communications module may determine when to transmit information from administrator device 204 to external servers via network 206. In some embodiments, the communications module receives information from security auto smart group system 202, via network 104. In some embodiments, the information transmitted or received by the communications module may correspond to a message, such as an email, generated or received by a messaging application.

In an implementation, administrator device 204 may include a messaging application (not shown). A messaging application may be any application capable of viewing, editing, and/or sending messages. For example, a messaging application may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application can be configured to display electronic training. In some examples, administrator device 204 may receive notifications from auto smart group system 202 via the messaging application, display received messages for the user using display 252, and display training provided by training manager 228. In some embodiments, administrator device 204 may include one or more applications 254 that provides the tool to manage auto smart group system 202. The term "application" as used herein may refer to one or more applications, services, routines, or other executable logic or instructions. In some embodiments, administrator device 204 may access the tool through a browser to manage auto smart group system 202.

The tool may provide options to track query-based groups of users on the system administrator's dashboard. The dashboard may present analytics that are shown as graphs depicting user count over time as well as a calculated risk score associated with the query-based groups of users. Auto smart group system 202 may provide an option in the dashboard, by adding, for example, a "discover page" where the system administrator is provided with the flagged user count and flagged criteria data, and given an option to begin tracking the created query-based group of users. If the system administrator chooses to begin tracking, the query-based group of users may be added to the system administrator dashboard, and a calculation of risk score for the query-based group of users may begin. Also, the system administrator may initiate remedial or reinforcement training to a query-based group of users through training manager 228. The system administrator may also be provided an option to choose to discard the query-based group of users. The tool may discard the query-based group of users in response to the selection of the option by the system administrator, and the flagged criteria may be added to shelved criteria storage 242. Shelved criteria storage 242 may be referenced when presenting flagged criteria on the system administrators' dashboard and may not display the query-based group of users if the query-based group of users is a duplicate.

Figure 3:
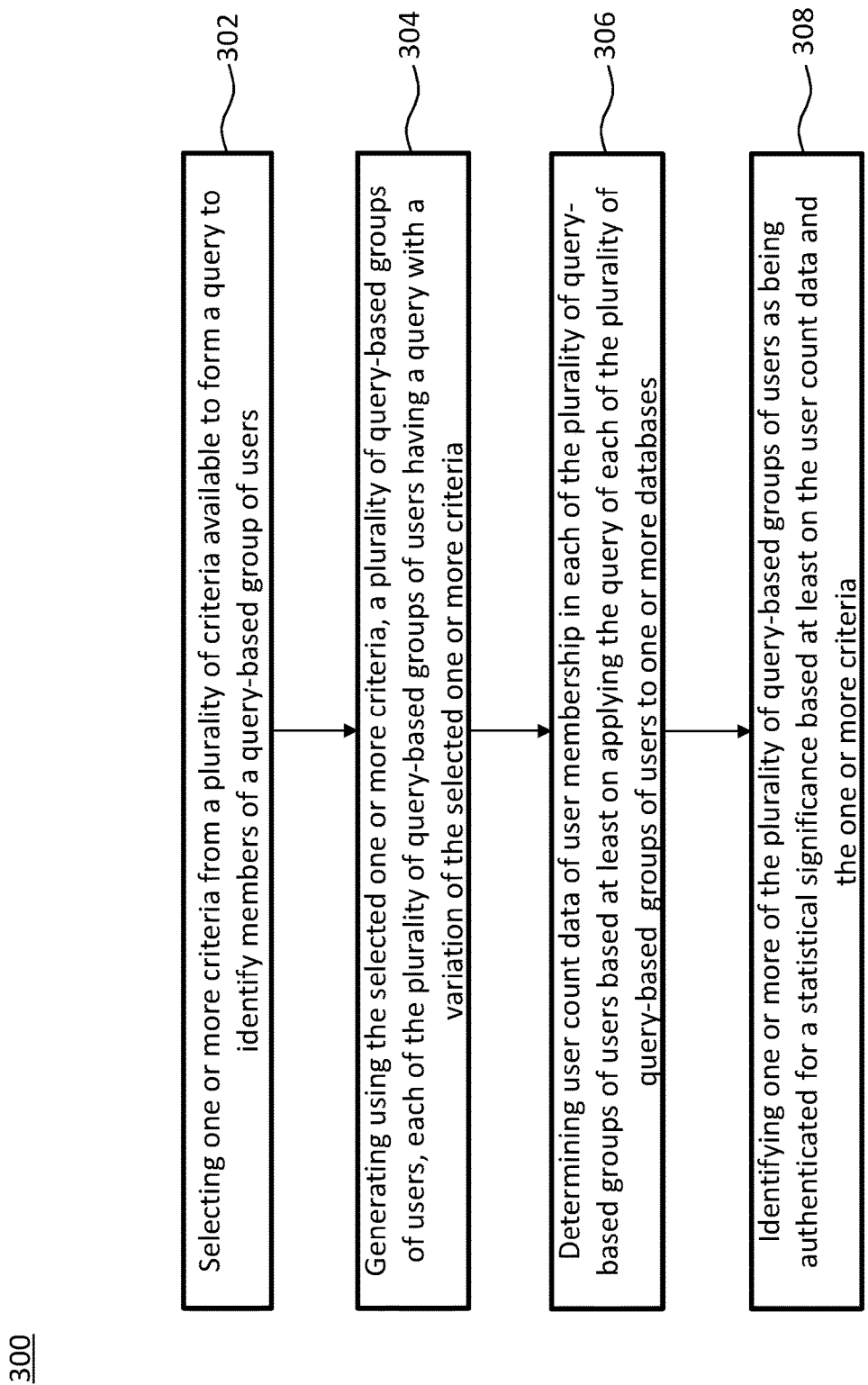
FIG. 3 depicts an implementation of a method for creating variations of criteria for a query-based group of users, according to one embodiment.

Referring to FIG. 3 in a general overview, FIG. 3 depicts an implementation of a method for creating variations of criteria for a query-based group of users, according to one embodiment. In a brief overview of an implementation of process flow 300, at step 302, one or more criteria may be selected from a plurality of criteria available to form a query to identify members of a query-based group of users. At step 304, a plurality of query-based groups of users may be generated using the selected one or more criteria. Each of the plurality of query-based groups of users may have a query with a variation of the selected one or more criteria. At step 306, user count data of user membership may be determined in each of the plurality of query-based groups of users based at least on applying the query of each of the plurality of query-based groups of users to one or more databases. At step 308, one or more of the plurality of query-based groups of users may be identified as being validated for a statistical significance based at least on the user count data and the one or more criteria.

Step 302 includes selecting one or more criteria from a plurality of criteria available to form a query to identify members of a query-based group of users. In an embodiment, the one or more criteria may include a field criteria and/or a string criteria, in addition to modifying specifications. In an embodiment, the field criteria may include user field, user date, phishing event, training event, or assessment as described in Tables 2, 3, 4, 5 and 6, respectively. In one example, the field criteria may be provided as options, such as for example, drop-down options. In an embodiment, the string criteria may be a user string input. One example of user string input may include strings of values such as an email domain or date. In one example, the string criteria may be available as options, such as for example, drop-down options, or may be provided as a string that can be entered in a form. In some examples, criteria generator 212 may select one or more field criteria and/or one or more string criteria to generate a query and variations of the query. In one example embodiment, criteria generator 212 may select up to five (5) separate field criteria and/or string criteria to be analyzed for generation of query-based groups of users. In some example embodiments, criteria generator 212 may select no more than five (5) separate field criteria and/or string criteria to be analyzed. In an example, when at least one of the selected criteria are from the string criteria, criteria generator 212 may iterate for a value with a set step. For example, criteria generator 212 may increase a numerical value by 0.2, increase a date by one day, or choose a domain name from a list of used domain names. In some examples, criteria generator 212 may perform the selection of the one or more criteria.

Step 304 includes generating, using the selected one or more criteria, a plurality of query-based groups of users, each of the plurality of query-based groups of users having a query with a variation of the selected one or more criteria. In some examples, group creator 214 may generate the plurality of query-based groups of users using the selected one or more criteria.

Step 306 includes determining user count data of user membership in each of the plurality of query-based groups of users based at least on applying the query of each of the plurality of query-based groups of users to one or more databases. In some examples, user count unit 216 may determine user count data in each of the plurality of query-based groups of users. In an example, user count unit 216 may apply the query of each of the plurality of query-based groups of users to service subscriber storage 234 to generate user count data of user membership in each of the plurality of query-based groups of users. In some examples, user count unit 216 may use structured query language to apply the query. In some examples, normalizer 218 may adjust the data from one or more databases such as service subscriber storage 234 to remove outliers or other abnormalities from data that may distort the user count data.

Step 308 includes identifying one or more of the plurality of query-based groups of users as being validated for a statistical significance based at least on the user count data and the one or more criteria. In one embodiment, significance analyzer 220 may identify one or more of the plurality of query-based groups of users as being validated for a statistical significance. Significance analyzer 220 may analyze the generated user count data for each of the plurality of query-based group of users to determine if each group is of a statistical significance. In some examples, significance analyzer 220 may use statistical analysis techniques to determine the statistical significance for each of the plurality of query-based group of users. In some examples, significance analyzer 220 may flag criteria as insignificant if the user count has a zero rate of change or zero user membership. Significance analyzer 220 may validate the one or more criteria associated with the query, and the user count data for the statistical significance and may store the one or more criteria associated with the query, and the user count data in criteria index storage 232 and benchmark user count storage 236, respectively.

In some examples, the system administrator may have generated queries by manually selecting one or more criteria. Auto smart group system 202 may append the system administrator generated queries to criteria index storage 232, and may use normalizer 218 on the system administrator generated queries to remove outliers or other abnormalities from data that may distort the user count data for a query-based group of users. User count unit 216 may generate user count data of user membership associated with the system administrator generated queries in a manner similar to generation of user count data of user membership by criteria generator 212.

Figure 4:
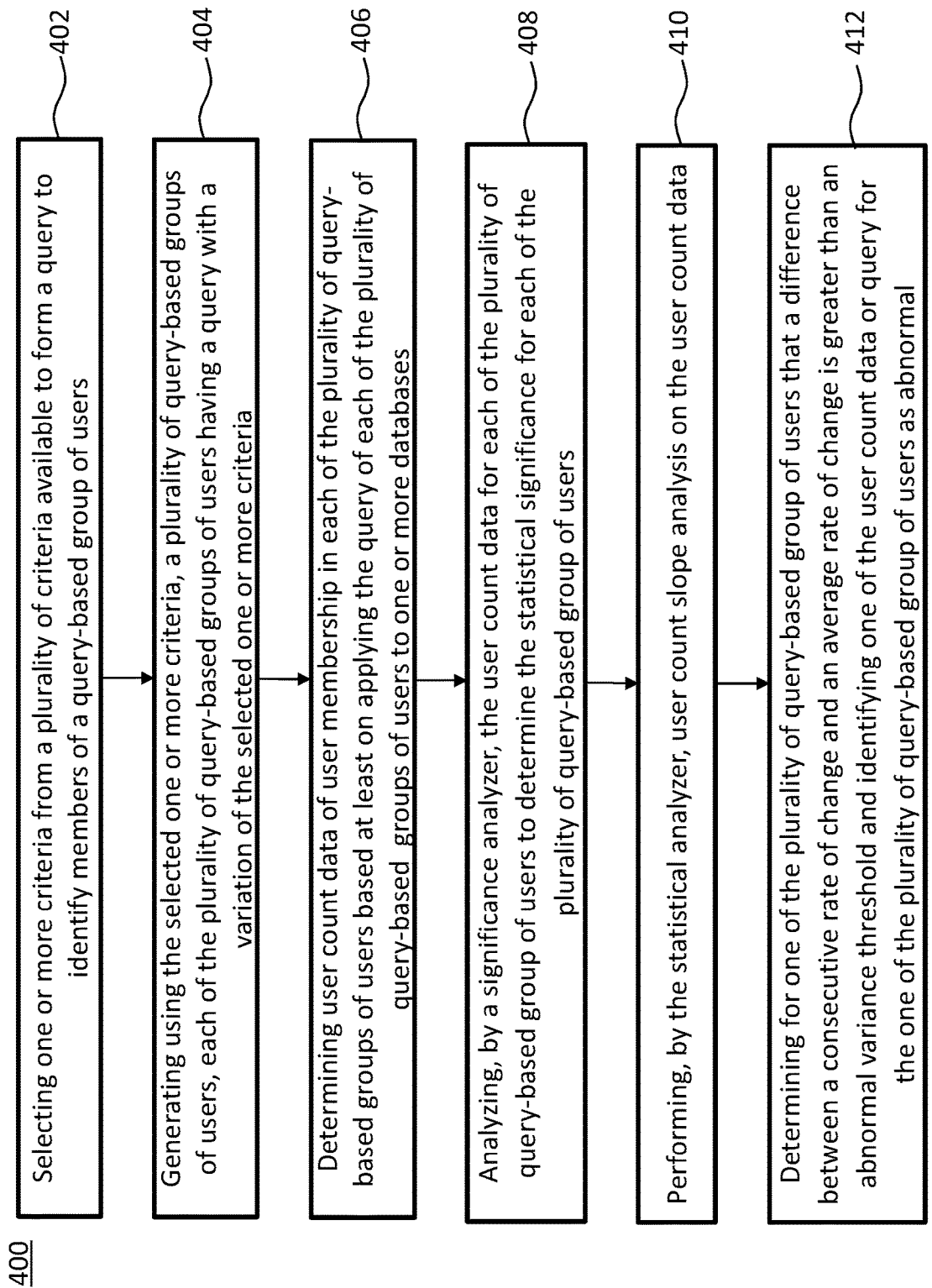
FIG. 4 depicts an implementation of a method for identifying an abnormal user count data or query for a one of a plurality of query-based group of users, according to one embodiment.

Referring to FIG. 4 in a general overview, FIG. 4 depicts an implementation of a method for identifying an abnormal user count data or query for a one of a plurality of query-based group, according to one embodiment. In a brief overview of an implementation of process flow 400, at step 402, one or more criteria may be selected from a plurality of criteria available to form a query to identify members of a query-based group of users. At step 404, a plurality of query-based groups of users may be generated using the selected one or more criteria. Each of plurality of query-based groups of users may have a query with a variation of the selected one or more criteria. At step 406, user count data of user membership may be determined in each of the plurality of query-based groups of users based at least on applying the query of each of the plurality of query-based groups of users to one or more databases. At step 408, the user count data for each of the plurality of query-based group of users may be analyzed to determine the statistical significance for each of the plurality of query-based group of users. At step 410 user count slope analysis may be performed on the user count data. At step 412, a difference between a consecutive rate-of-change and an average rate-of-change may be determined as greater than an abnormal variance threshold for one of the plurality of query-based group of users, and one of the user count data or query for the one of the plurality of query-based group of users may be identified as abnormal.

Step 404 includes generating using the selected one or more criteria, a plurality of query-based groups of users, each of the plurality of query-based groups of users having a query with a variation of the selected one or more criteria. In some examples, group creator 214 may generate the plurality of query-based groups of users using the selected one or more criteria.

Step 406 includes determining user count data of user membership in each of the plurality of query-based groups of users based at least on applying the query of each of the plurality of query-based groups of users to one or more databases. In some examples, user count unit 216 may determine user count data in each of the plurality of query-based groups of users. In an example, user count unit 216 may apply the query of each of the plurality of query-based groups of users to service subscriber storage 234 to generate user count data of user membership in each of the plurality of query-based groups of users. In some examples, user count unit 216 may use structured query language to apply the query. In some examples, normalizer 218 may adjust the data from one or more databases such as service subscriber storage 234 to remove outliers or other abnormalities from data that may distort the user count data.

Step 408 includes analyzing the user count data for each of the plurality of query-based group of users to determine the statistical significance for each of the plurality of query-based group of users. In one embodiment, user count unit 226 may determine user count data of user membership in each of the plurality of query-based groups of users. Significance analyzer 220 may be configured to validate that the user count data for a chosen query-based group of users displays statistical correlation. Significance analyzer 220 may perform a regression analysis on collected user count data with the associated timestamp to determine an $R^2$ value. In an example, the $R^2$ value is a statistical significance threshold representing acceptable correlation between datapoints from regression analysis. Significance analyzer 220 may discard a query associated with the chosen query-based group of users if the $R^2$ value for the chosen query-based group of users is below a statistical significance threshold.

Step 410 includes performing user count slope analysis on the user count data. Statistical analyzer 224 may read the user count data from service subscriber storage 234 and may perform user count slope analysis on the user count data for each of the plurality of query-based group of users.

Step 412 includes determining for one of the plurality of query-based group of users that a difference between a consecutive rate-of-change and an average rate-of-change is greater than an abnormal variance threshold and identifying one of the user count data or query for the one of the plurality of query-based group of users as abnormal. In some examples, statistical analyzer 224 may determine an average rate-of-change for one of the plurality of query-based group of users over a declared time interval, and compare it with a rate-of-change between consecutive user count datapoints. If the difference between the rate-of-change between consecutive user count datapoints and the average rate-of-change for one of the plurality of query-based group of users over a declared time interval is greater than an abnormal variance threshold, statistical analyzer 224 may identify the user count data or the corresponding query for the one of the plurality of query-based group of users as abnormal. In some examples, statistical analyzer 224 may store the user count data and the corresponding query in flagged user count storage 244 and flagged criteria storage 240, respectively.

Figure 5:
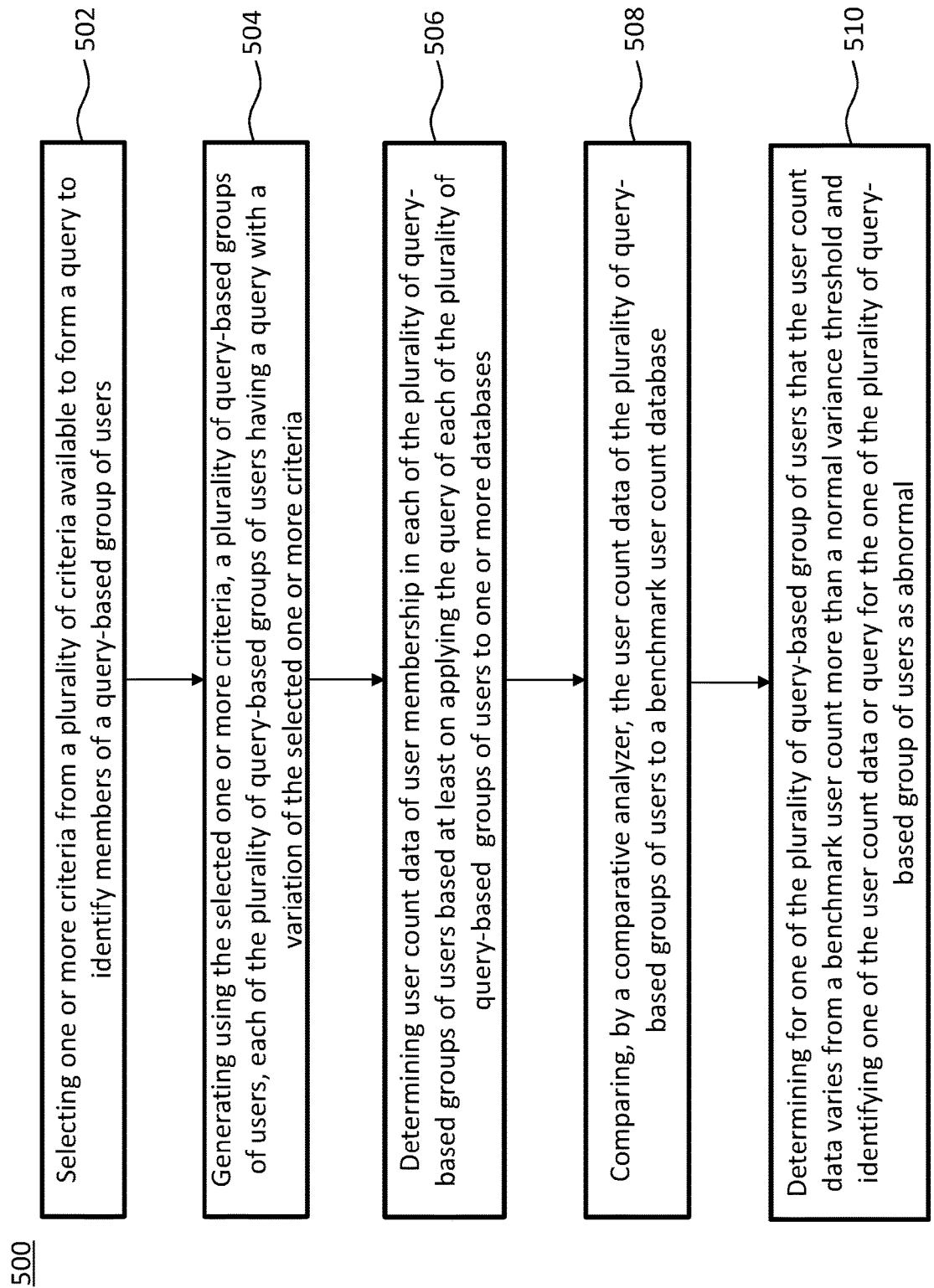
FIG. 5 depicts an implementation of a method for identifying an abnormal user count data or query for a one of a plurality of query-based group, according to one embodiment.

Referring to FIG. 5 in a general overview, FIG. 5 depicts an implementation of a method for identifying an abnormal user count data or query for a one of a plurality of query-based groups, according to one embodiment. In a brief overview of an implementation of process flow 500, at step 502, one or more criteria may be selected from a plurality of criteria available to form a query to identify members of a query-based group of users. At step 504, a plurality of query-based groups of users may be generated using the selected one or more criteria. Each of plurality of query-based groups of users may have a query with a variation of the selected one or more criteria. At step 506, user count data of user membership may be determined in each of the plurality of query-based groups of users based at least on applying the query of each of the plurality of query-based groups of users to one or more databases. At step 508, the user count data of the plurality of query-based groups of users may be compared to a benchmark user count database. At step 510, it may be determined that the user count data varies from a benchmark user count more than an abnormal variance threshold for one of the plurality of query-based groups of users, and one of the user count data or query for the one of the plurality of query-based groups of users may be identified as abnormal.

Step 502 includes selecting one or more criteria from a plurality of criteria available to form a query to identify members of a query-based group of users. In an embodiment, the one or more criteria may include a field criteria and/or a string criteria, in addition to modifying specifications. In an embodiment, the field criteria may include user field, user date, phishing event, training event, or assessment as described in Tables 2, 3, 4, 5 and 6, respectively. In one example, the field criteria may be provided as options, such as for example, drop-down options. In an embodiment, the string criteria may be a user string input. One example of user string input may include strings of values such as an email domain or date. In one example, the string criteria may be available as options, such as for example, drop-down options, or may be provided as a string that can be entered in a form. In some examples, criteria generator 212 may select one or more field criteria and/or one or more string criteria to generate a query and variations of the query. In one example embodiment, criteria generator 212 may select up to five (5) separate field criteria and/or string criteria to be analyzed for generation of query-based groups of users. In some example embodiments, criteria generator 212 may select more than five (5) separate field criteria and/or string criteria to be analyzed. In an example, when the selected criteria are from the string criteria, criteria generator 212 may iterate for a value with a set step. For example, criteria generator 212 may increase a numerical value by 0.2, increase a date by one day, or choose a domain name from a list of used domain names. In some examples, criteria generator 212 may perform the selection of the one or more criteria.

Step 504 includes generating using the selected one or more criteria, a plurality of query-based groups of users, each of the plurality of query-based groups of users having a query with a variation of the selected one or more criteria. In some examples, group creator 214 may generate a plurality of query-based groups of users using the selected one or more criteria.

Step 506 includes determining user count data of user membership in each of the plurality of query-based groups of users based at least on applying the query of each of the plurality of query-based groups of users to one or more databases. In some examples, user count unit 216 may determine user count data in each of the plurality of query-based groups of users. In an example, user count unit 216 may apply the query of each of the plurality of query-based groups of users to service subscriber storage 234 to generate user count data of user membership in each of the plurality of query-based groups of users. In some examples, user count unit 216 may use structured query language to apply the query. In some examples, normalizer 218 may adjust the data from one or more databases such as service subscriber storage 234 to remove outliers or other abnormalities from data that may distort the user count data.

Step 508 includes comparing the user count data of the plurality of query-based groups of users to a benchmark user count database. In some examples, comparative analyzer 222 may compare the user count data of the plurality of query-based groups of users to a benchmark user count database. In one or more embodiments, comparative analyzer 222 may scale the user count data in benchmark user count storage 236 to be compatible with the system administrator's organization. In some examples, comparative analyzer 222 may compare the user count data of the plurality of query-based groups of users to benchmark user count storage 236. For example, comparative analyzer 222 may compare the user count data for a system administrator working for a mid-size high tech company in a private sector against other high-tech companies working in the private sector, and user count data from incompatible companies (i.e., large public companies in other industries) may not be included in comparative analyzer 222 operations. In some examples, comparative analyzer 222 may scale the user count data in benchmark user count storage 236 to be compatible with related organizations.

Step 510 includes determining for one of the plurality of query-based groups of users that the user count data varies from a benchmark user count more than an abnormal variance threshold and identifying one of the user count data or query for the one of the plurality of query-based group of users as abnormal. In some examples, comparative analyzer 222 may perform the determination. Comparative analyzer 222 may store the identified user count data in flagged user count storage 244 and the query associated with the flagged user count data in flagged criteria storage 240. In some examples, auto smart group system 202 may display the user count data and the corresponding query from flagged criteria storage 240 and flagged user count storage 244 to the system administrator. In an example, auto smart group system 202 may display the user count data and the corresponding queries in the discover page via the tool, alerting the system administrator to atypical user count trend for auto smart group system 202. The discover page may be a section provided by the tool specifically to display data generated by auto smart group system 202. Auto smart group system 202 may provide an option to the system administrator to begin tracking the query-based group of users associated with the flagged user count data or to discard the flagged query associated with the query-based group of users.

The tool may provide options to track query-based groups of users on the system administrator's dashboard. The dashboard may present analytics that are shown are graphs depicting user count over time as well as a calculated risk score associated with the query-based groups of users. Auto smart group system 202 may provide an option in the dashboard, by adding, for example, the discover page, where the system administrator is provided with the flagged user count and flagged criteria data, and given an option to begin tracking the created query-based group of users. If the system administrator chooses to begin tracking, the query-based group of users may be added to the system administrator dashboard, and a calculation of risk score for the query-based group of users may begin. Also, the system administrator may initiate remedial or reinforcement training to a query-based group of users through training manager 228. The system administrator may also be provided an option to chooses to discard the query-based group of users. The tool may discard the query-based group of users in response to selection of the option by the system administrator, and the flagged criteria may be added to shelved criteria storage 242. Shelved criteria storage 242 may be referenced when presenting flagged criteria on the system administrators' dashboard and may not display the query-based group of users if the query-based group of users is a duplicate.

Figure 6:
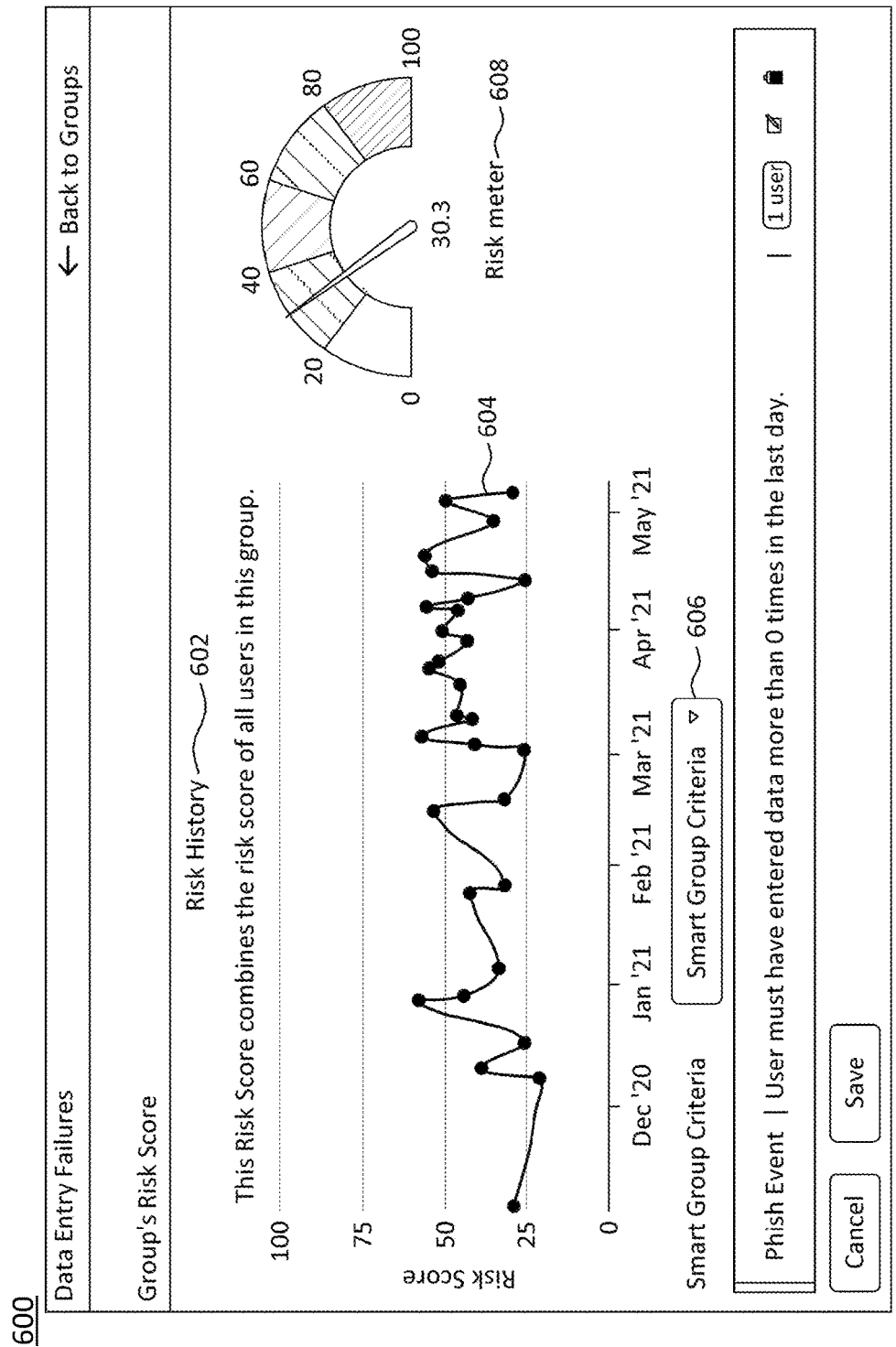
FIG. 6 is a user interface view depicting a dashboard illustrating a risk score for one of a query-based group of users, according to one embodiment.
Figure 7:
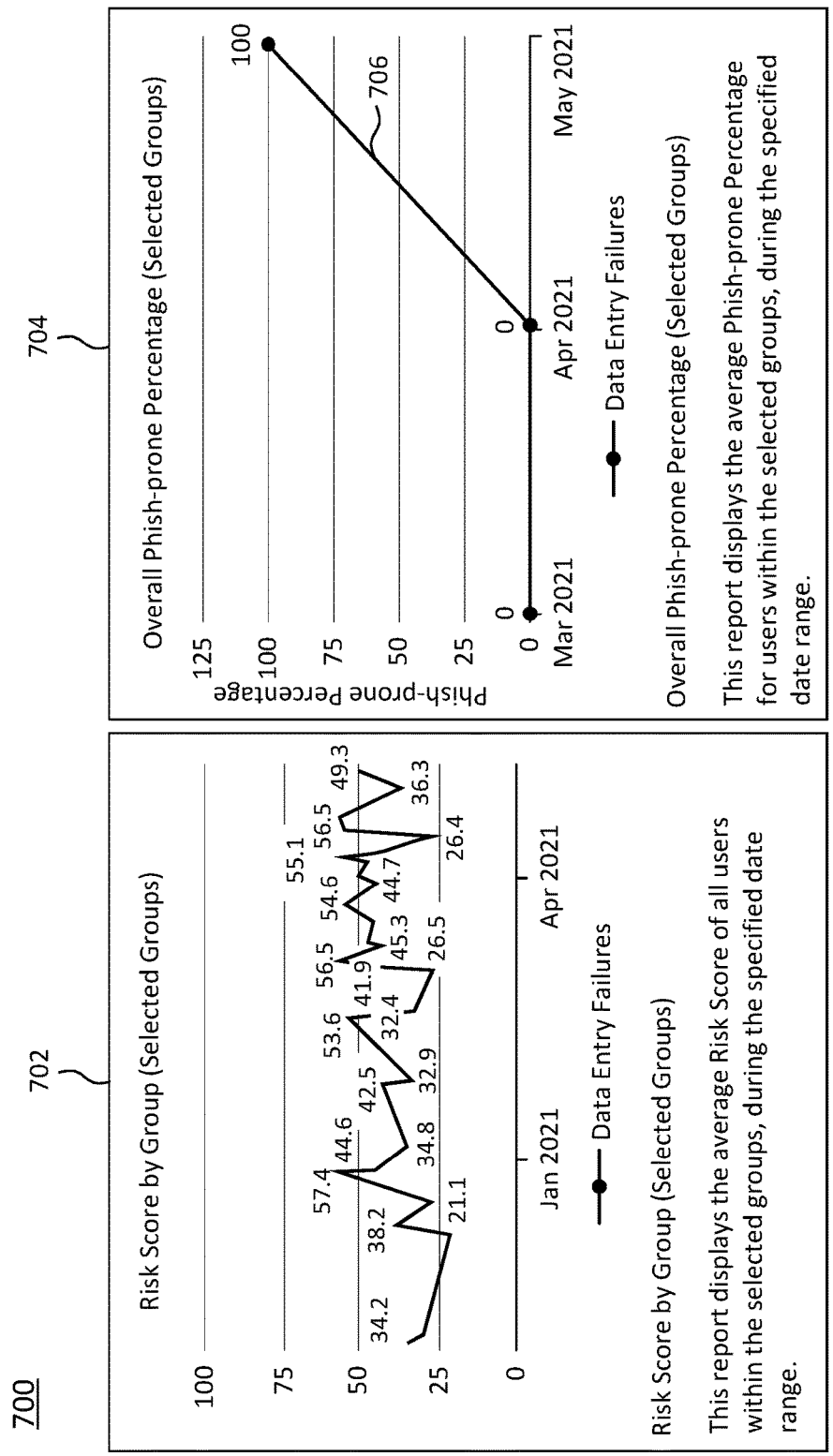
FIG. 7 is a user interface view depicting a risk score analysis of the one of the query-based group of users, according to one embodiment.
Figure 8:
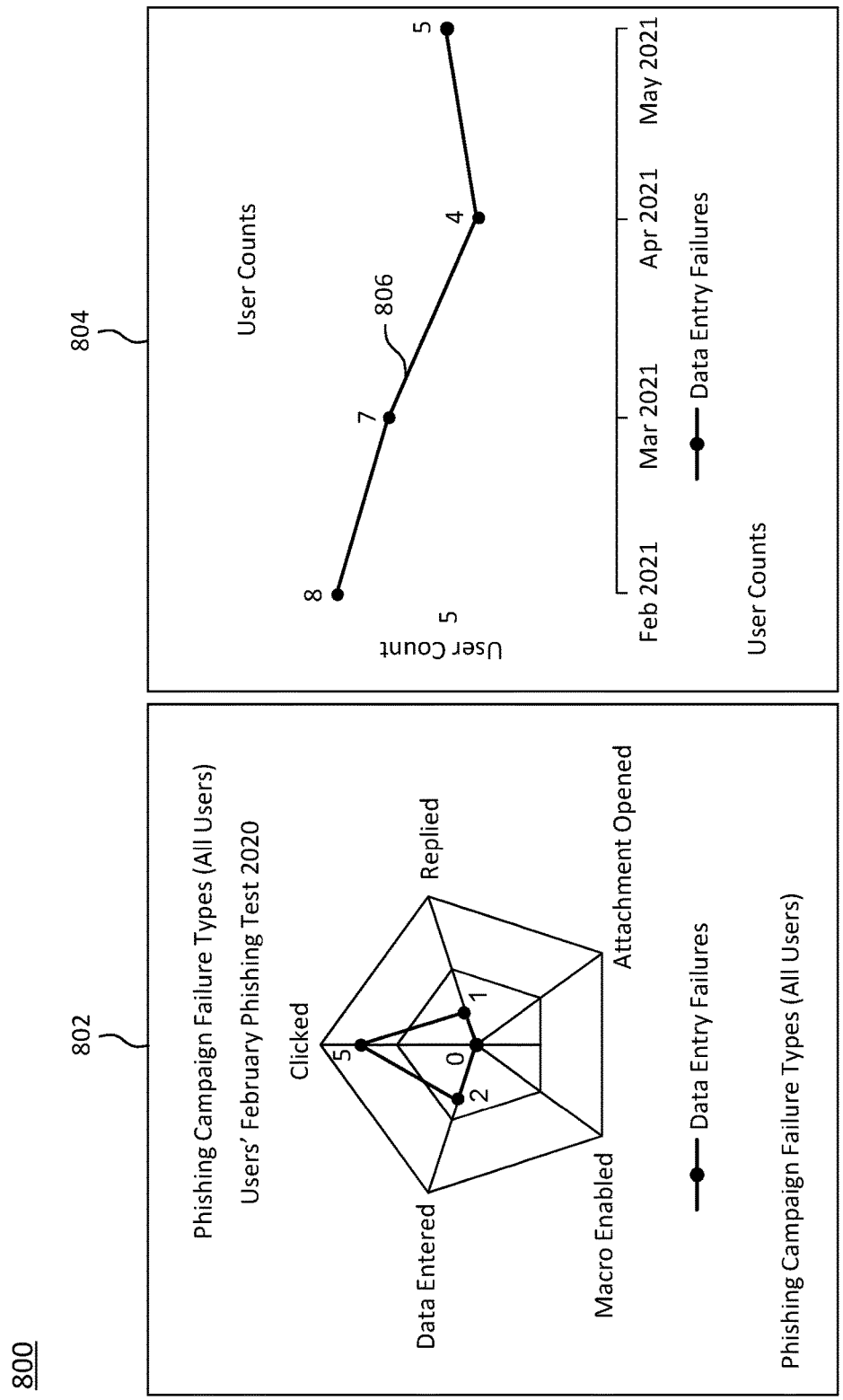
FIG. 8 is a user interface view depicting a further analysis of the risk score for the one of the query-based group of users, according to one embodiment.

FIG. 6 is a user interface view 600 depicting a dashboard illustrating a risk score for one of a query-based group of users, according to one embodiment. The dashboard illustrates a risk history 602 of one of a query-based group of users identified by auto smart group system 202 and chosen by the system administrator for tracking. As illustrated, a count data 604 is plotted against time to create trendlines to visualize data changes over the course of a given query-based user group's history. As shown, an option in a form of a dropdown option 606 is provided that enables the system administrator to choose or set categories of criteria in a query-based group to analyze the user count trend for a collection of specified criteria. The risk meter 608 indicates the risk score to be of 30.3%. FIG. 7 is a continuation of FIG. 6 illustrating a user interface view 700 depicting a risk score analysis of the one of the query-based group of users. As illustrated in FIG. 7, risk score FIG. 702 are provided on left side of the dashboard, and on right side, overall phish-prone percentage 704 for the selected group is shown to be increasing 706. FIG. 8 is a continuation of FIG. 7 illustrating a user interface view 800 depicting a further analysis of the risk scores for the one of the query-based group of users. FIG. 8 illustrates types of phishing campaign failures, particularly where user(s) have clicked on a phishing email in a phishing test (shown in left panel 802), and in right panel 804, user counts by month on month who may have been involved in phishing campaign failure. Left panel 802 or a phishing campaign failure type page illustrates that in user's February phishing test 2020, there were at least five (5) users who clicked on a simulated phishing communication, at least one (1) user who replied to the simulated phishing communication and at least two (2) users who entered data in a link provided by the simulated phishing communication. Also, there were no users who had enabled the macros or opened any attachments from the simulated phishing communications. The user counts in right panel 804 may illustrate a trend 806 within an organization or across organizations that can assist the system administrator in preparing the organization to defend itself from a cybersecurity threat by providing appropriate training to the specific query-based group of users involved.

The systems described above may provide multiple ones of any or each of those components, and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:
1. A method for creating variations of criteria for a query-based group of users, the method comprising:

selecting, by a device, one or more criteria from a plurality of criteria available to form a query to identify members of a query-based group of users;

generating using the selected one or more criteria, a plurality of query-based groups of users, each of the plurality of query-based groups of users having a query with a variation of the selected one or more criteria;

determining, by the device, user count data of user membership in each of the plurality of query-based groups of users based at least on applying the query of each of the plurality of query-based groups of users to one or more databases; and identifying, by the device, one of the plurality of query-based group of users as abnormal based at least on a difference between a consecutive rate of change and an average rate of change of user count data of user membership in the one of the plurality of query-based group of users being greater than an abnormal variance threshold.

2. The method of claim 1, wherein the criteria comprise one of a field criteria or a string criteria.

3. The method of claim 2, wherein the field criteria comprise one or more of a user field, user date, phishing event, training event or assessment.

4. The method of claim 1, further comprising selecting, by a criteria generator, one or more field criteria and string criteria for the one or more criteria from which to generate variations of the query to form the plurality of query-based groups of users.

5. The method of claim 1, further comprising adjusting, by a normalizer, data from the one or more databases to include relevant data points.

6. The method of claim 1, further comprising analyzing, by a significance analyzer, the user count data for each of the plurality of query-based group of users to determine the statistical significance for each of the plurality of query-based group of users.

7. The method of claim 1, further comprising performing, by the statistical analyzer, user count slope analysis on the user count data.

8. The method of claim 1, further comprising determining the average rate-of-change for one of the plurality of query-based group of users over a declared time interval.

9. The method of claim 1, further comprising comparing, by a comparative analyzer, the user count data of the plurality of query-based groups of users to a benchmark user count database.

10. The method of claim 9, further comprising determining for one of the plurality of query-based groups of users that the user count data varies from a benchmark user count more than a normal variance threshold and identifying one of the user count data or query for the one of the plurality of query-based groups of users as abnormal.

11. A system for creating variations of criteria for a query-based group of users, the system comprising:

one or more processors, coupled to memory and configured to:

select one or more criteria from a plurality of criteria available to form a query to identify members of a query-based group of users;

generate using the selected one or more criteria, a plurality of query-based groups of users, each of the plurality of query-based groups of users having a query with a variation of the selected one or more criteria;

determine user count data of user membership in each of the plurality of query-based groups of users based at least on applying the query of each of the plurality of query-based groups of users to one or more databases; and identify one of the plurality of query-based group of users as abnormal based at least on a difference between a consecutive rate of change and an average rate user count data of user membership in the one of the plurality of query-based group of users being greater than an abnormal variance threshold.

12. The system of claim 11, wherein the criteria comprise one of a field criteria or a string criteria.

13. The system of claim 12, wherein the field criteria comprise one or more of a user field, user date, phishing event, training event or assessment.

14. The system of claim 11, wherein the one or more processors are further configured to execute a criteria generator to select one or more field criteria and string criteria for the one or more criteria from which to generate variations of the query to form the plurality of query-based groups of users.

15. The system of claim 11, wherein the one or more processors are further configured to execute a normalizer to adjust data from one or more databases to include relevant data points.

16. The system of claim 11, wherein the one or more processors are further configured to execute a significance analyzer to analyze the user count data for each of the plurality of query-based groups of users to determine the statistical significance for each of the plurality of query-based groups of users.

17. The system of claim 11, wherein the one or more processors are further configured to execute a statistical analyzer to perform user count slope analysis on the user count data.

18. The system of claim 11, wherein the one or more processors are further configured to determine the average rate-of-change for one of the plurality of query-based group of users over a declared time interval.

19. The system of claim 11, wherein the one or more processors are further configured to execute a comparative analyzer to compare the user count data of the plurality of query-based groups of users to a benchmark user count database.

20. The system of claim 11, wherein the one or more processors are further configured to execute the comparative analyzer to determine for one of the plurality of query-based groups of users that the user count data varies from a benchmark user count more than a normal variance threshold and identify one of the user count data or query for the one of the plurality of query-based groups of users as abnormal.

* * * * *